(12) United States Patent
Nishimura et al.

(10) Patent No.: US 9,708,008 B2
(45) Date of Patent: Jul. 18, 2017

(54) VEHICLE BODY STRUCTURE OF VEHICLE SIDE PORTION

(71) Applicant: MAZDA MOTOR CORPORATION, Hiroshima (JP)

(72) Inventors: Yoshikazu Nishimura, Hiroshima (JP);
Hideaki Hoshuyama, Hiroshima (JP);
Makoto Morimitsu, Hatsukaichi (JP);
Seigo Taguchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/896,823

(22) PCT Filed: Nov. 6, 2014

(86) PCT No.: PCT/JP2014/079487
§ 371 (c)(1),
(2) Date: Dec. 8, 2015

(87) PCT Pub. No.: WO2015/072392
PCT Pub. Date: May 21, 2015

(65) Prior Publication Data
US 2016/0129944 A1 May 12, 2016

(30) Foreign Application Priority Data
Nov. 14, 2013 (JP) .................. 2013-235802

(51) Int. Cl.
*B62D 25/04* (2006.01)
*B62D 25/06* (2006.01)

(52) U.S. Cl.
CPC ............. *B62D 25/04* (2013.01); *B62D 25/06* (2013.01)

(58) Field of Classification Search
CPC ................................ B62D 25/04; B62D 25/06
(Continued)

(56) References Cited

U.S. PATENT DOCUMENTS

| 5,873,618 A | 2/1999 | Ejima |
| 2008/0122259 A1 | 5/2008 | Matsui |

(Continued)

FOREIGN PATENT DOCUMENTS

| CN | 101920724 A | 12/2010 |
| JP | H02-42876 U | 3/1990 |

(Continued)

OTHER PUBLICATIONS

A First Office Action issued by the Chinese Patent Office on Sep. 5, 2016, which corresponds to Chinese Patent Application No. 201480035684.7 and is related to U.S Appl. No. 14/896,823; with English language summary.

(Continued)

*Primary Examiner* — Glenn Dayoan
*Assistant Examiner* — Dana Ivey
(74) *Attorney, Agent, or Firm* — Studebaker & Brackett PC

(57) ABSTRACT

A roof reinforcement (20) includes an upper surface portion (21) to be joined to a roof panel (3), and a recess portion (22) formed in such a manner as to be recessed below the upper surface portion (21). A rising piece (27) rising from a bottom surface portion (23) upwardly, and a joint piece (28) extending from an upper end of the rising piece (27) outwardly in the vehicle width direction are formed at both ends of the bottom surface portion (23) of the recess portion (22) in the vehicle width direction. The joint piece (28) is welded to the roof panel (3) and to each of flange portions (3a, 16a, 17a) of the roof reinforcement (20).

5 Claims, 9 Drawing Sheets

(58) Field of Classification Search
USPC .......................................... 296/193.06, 210
See application file for complete search history.

(56) References Cited

U.S. PATENT DOCUMENTS

| | | |
|---|---|---|
| 2010/0314911 A1 | 12/2010 | Morgans et al. |
| 2013/0320716 A1 | 12/2013 | Nishimura et al. |
| 2014/0319877 A1* | 10/2014 | Hida .................... B62D 25/02 |
| | | 296/191 |

FOREIGN PATENT DOCUMENTS

| JP | H09-76938 A | 3/1997 |
|---|---|---|
| JP | 2008-132923 A | 6/2008 |
| JP | 2009-214561 A | 9/2009 |
| JP | 2012-176635 A | 9/2012 |

OTHER PUBLICATIONS

International Search Report in PCT/JP2014/079487, mailed Feb. 10, 2015.

* cited by examiner

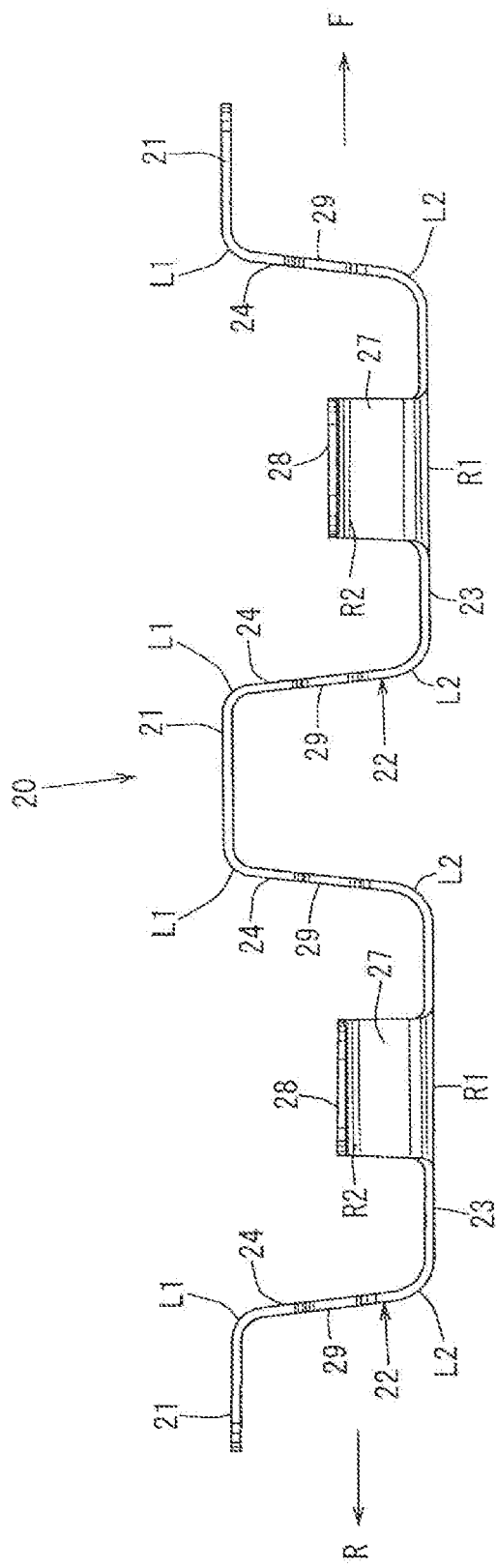

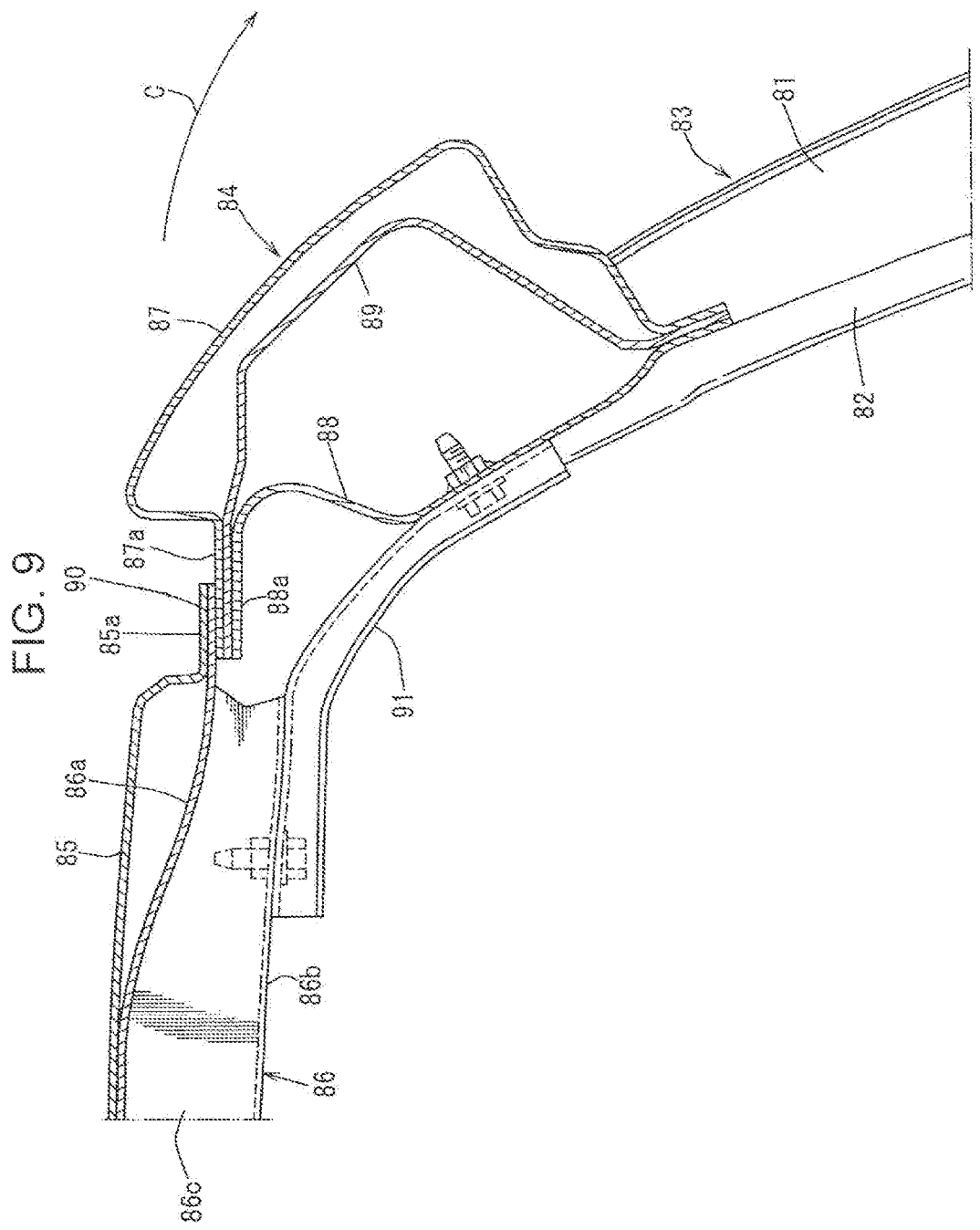

VEHICLE BODY STRUCTURE OF VEHICLE SIDE PORTION

TECHNICAL FIELD

The present invention relates to a vehicle body side structure for a vehicle, and belongs to the technical field of providing countermeasures against side collisions of a vehicle.

BACKGROUND ART

As a conventional art, Patent Literature 1 discloses an example of the aforementioned vehicle body side structure for a vehicle. As illustrated in FIG. 9, the vehicle body side structure disclosed in Patent Literature 1 is provided with a center pillar 83 including a center pillar outer member 81 and a center pillar inner member 82, and extending in the vehicle up-down direction; a pair of left and right roof side rail portions 84 (in FIG. 9, only one of the roof side rail portions 84 is illustrated) disposed on the upper side of the center pillar 83, and extending in the vehicle front-rear direction; and a roof reinforcement 86 extending in the vehicle width direction along the lower surface of a roof panel 85, and configured to connect between the left and right roof side rail portions 84 at the position corresponding to the center pillar 83.

Each of the roof side rail portions 84 includes a roof side rail outer member 87, a roof side rail inner member 88, and a roof side reinforcement 89. The roof panel 85 includes a flange portion 85a at a one-step lower position on the outer side thereof in the vehicle width direction. The roof side rail outer member 87 includes a flange portion 87a at a one-step lower position on the inner side thereof in the vehicle width direction. The roof side rail inner member 88 includes a flange portion 88a at the upper end thereof. The flange portion 87a of the roof side rail outer member 87, the flange portion 88a of the roof side rail inner member 88, and the flange portion 85a of the roof panel 85 are fixed to each other by welding.

The roof reinforcement 86 includes an upper surface portion 86a which comes into contact with the roof panel 85, a bottom surface portion 86b, and a vertical wall portion 86c for vertically connecting between the upper surface portion 86a and the bottom surface portion 86b. The roof reinforcement 86 has an upside-down hat shape in side view.

The upper surface portion 86a of the roof reinforcement 86 includes an outer end and its vicinity in the vehicle width direction, which are configured such that the height is gradually decreased toward the outer end of the roof reinforcement 86. A joint piece 90 is integrally formed at the outer end of the upper surface portion 86a. The joint piece 90 is welded to each of the flange portions 85a, 87a, and 88a.

Specifically, the height position of the flange portion 85a, 87a, 88a is lower than the height position of the joint piece 90. Therefore, the height of the upper surface portion 86a of the roof reinforcement 86 is gradually decreased toward the outer end of the roof reinforcement 86 so that the height position of the joint piece 90 is equal to the height position of the flange portion 87a.

Further, a gusset 91 as a strength reinforcement member is provided between the bottom surface portion 86b of the roof reinforcement 86, and the roof side rail inner member 88 of the roof side rail portion 84 for connecting between the bottom surface portion 86b and the roof side rail inner member 88.

In the conventional structure illustrated in FIG. 9, however, the height position of the joint piece 90 is limited by the height positions of the flange portions 85a, 87a, and 88a.

Further, at the time of side collision of a vehicle, a side collision load is input to the center pillar 83. Then, a moment of rotation illustrated by the arrow C in FIG. 9 is applied to the roof side rail portion 84 as a reaction of the side collision load. As a result, the roof side rail portion 84 intrudes inwardly in the vehicle width direction accompanied by pivotal movement of the roof side rail portion 84 by the moment of rotation. When the aforementioned phenomenon occurs, the roof reinforcement 86 fails to completely receive the side collision load, because the cross sectional space around the end of the roof reinforcement 86 is small due to the aforementioned structure, in which the height of the upper surface portion 86a is gradually decreased at the end of the roof reinforcement 86. Consequently, it may be impossible to transfer the side collision load to the roof side rail portion on the opposite side in the vehicle width direction.

CITATION LIST

Patent Literature

Patent Literature 1: Japanese Unexamined Patent Publication No. 2012-176635

SUMMARY OF INVENTION

In view of the above, an object of the invention is to provide a vehicle body side structure for a vehicle, which enables to prevent intrusion of a center pillar into a vehicle chamber at the time of side collision as much as possible by efficiently distributing a side collision load input to the center pillar.

A vehicle body side structure for a vehicle according to the invention includes a roof panel; a pair of vertically extending left and right center pillars; a pair of left and right roof side rail portions extending in a front-rear direction of the vehicle on an upper side of each of the center pillars; and a roof reinforcement extending in a vehicle width direction along a lower surface of the roof panel, and configured to connect between the paired roof side rail portions at positions corresponding to the center pillars. The roof side rail portion includes a roof side rail outer member and a roof side rail inner member. The roof panel includes a flange portion at a one-step lower position on an outer side thereof in the vehicle width direction. The roof side rail outer member includes a flange portion at a one-step lower position on an inner side thereof in the vehicle width direction. The roof side rail inner member includes a flange portion at an upper end thereof. The flange portion of the roof side rail outer member, the flange portion of the roof side rail inner member, and the flange portion of the roof panel are welded to each other. The roof reinforcement includes an upper surface portion joined to the roof panel, and a recess portion formed to be recessed below the upper surface portion.

A rising piece rising from a bottom surface portion of the recess portion upwardly, and a joint piece extending from an upper end of the rising piece outwardly in the vehicle width direction are formed at both ends of the bottom surface portion in the vehicle width direction. The joint piece is welded to each of the flange portions.

According to the invention, it is possible to bring the upper surface portion of the roof reinforcement in proximity to the roof panel, and to secure a sufficient cross sectional space around the end of the roof reinforcement. This is advantageous in preventing deformation of the roof side rail portion at the time of side collision of a vehicle. The aforementioned configuration is advantageous in efficiently transferring a side collision load input to the center pillar to the opposite side in the vehicle width direction via the roof reinforcement, and in preventing intrusion of the center pillar into a vehicle chamber at the time of side collision as much as possible.

BRIEF DESCRIPTION OF DRAWINGS

FIG. 8 is a side view of the roof reinforcement; and

FIG. 9 is a sectional view illustrating a conventional vehicle body side structure for a vehicle.

DESCRIPTION OF EMBODIMENTS

In the following, an embodiment of the invention is described in detail based on the drawings.

Figure 1:
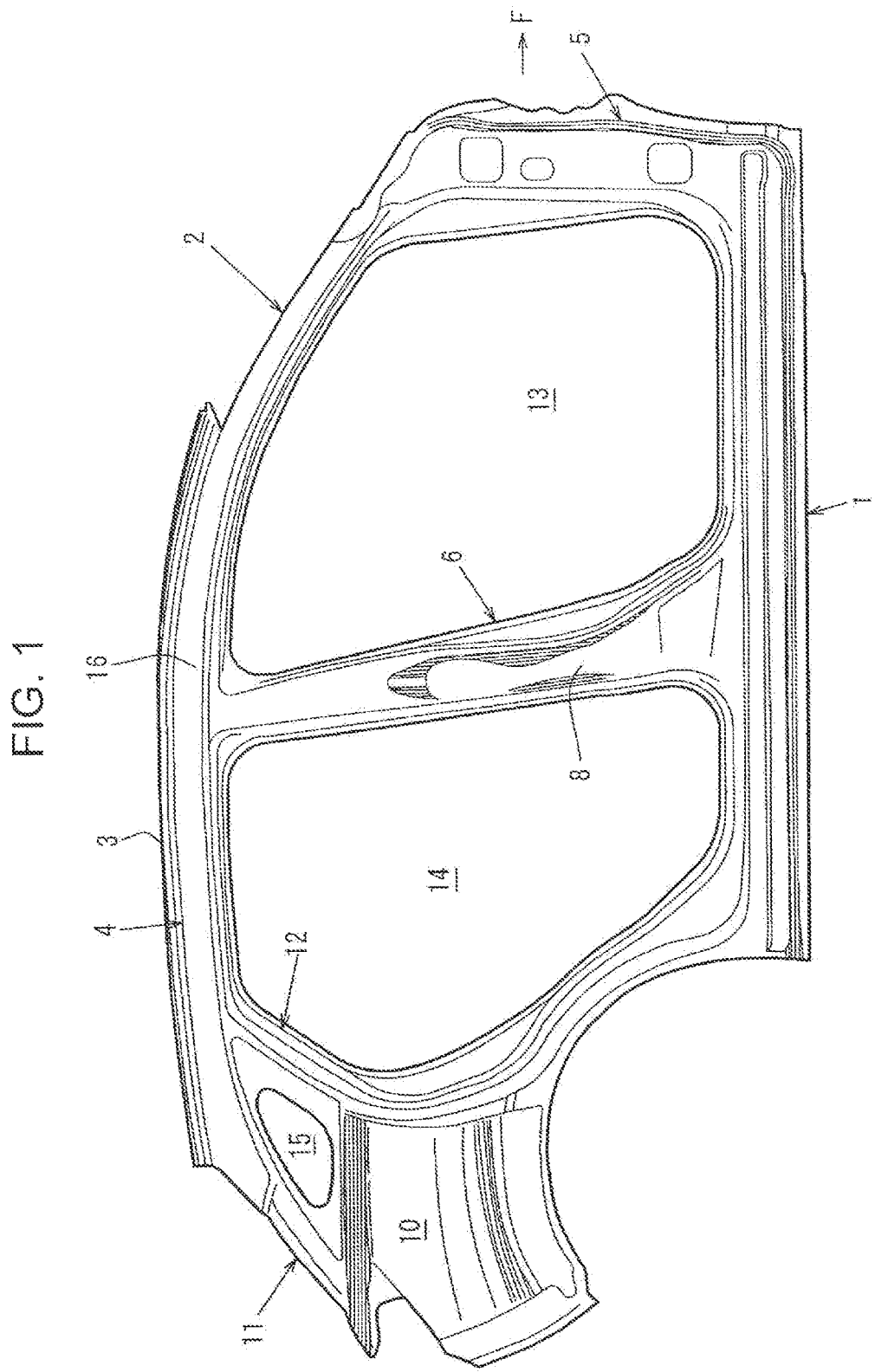
FIG. 1 is an overall side view of a vehicle body to which a vehicle body side structure of the invention is applied.
Figure 2:
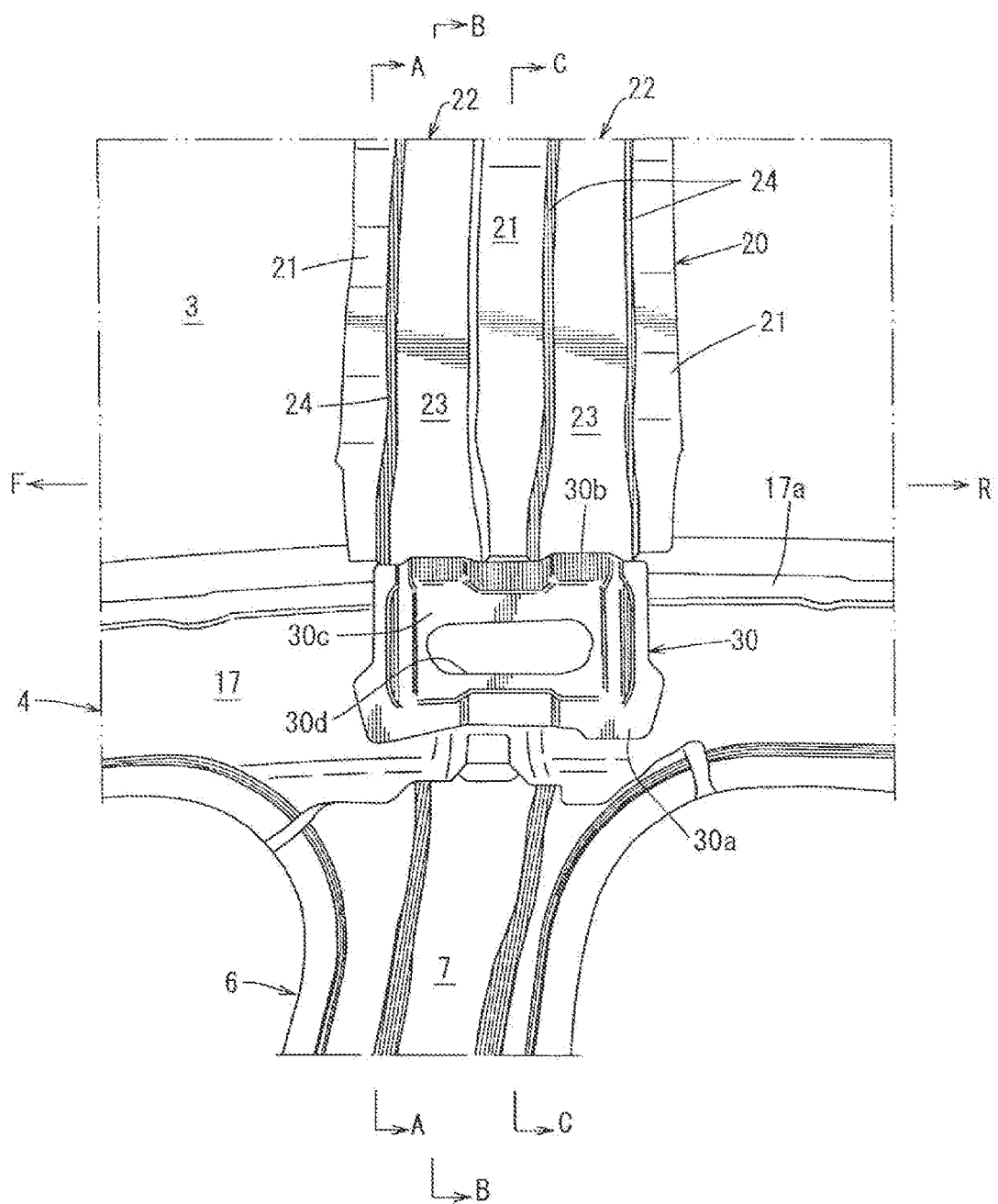
FIG. 2 is a bottom surface view illustrating essential parts of a vehicle body structure of a vehicle right side part.
Figure 3:
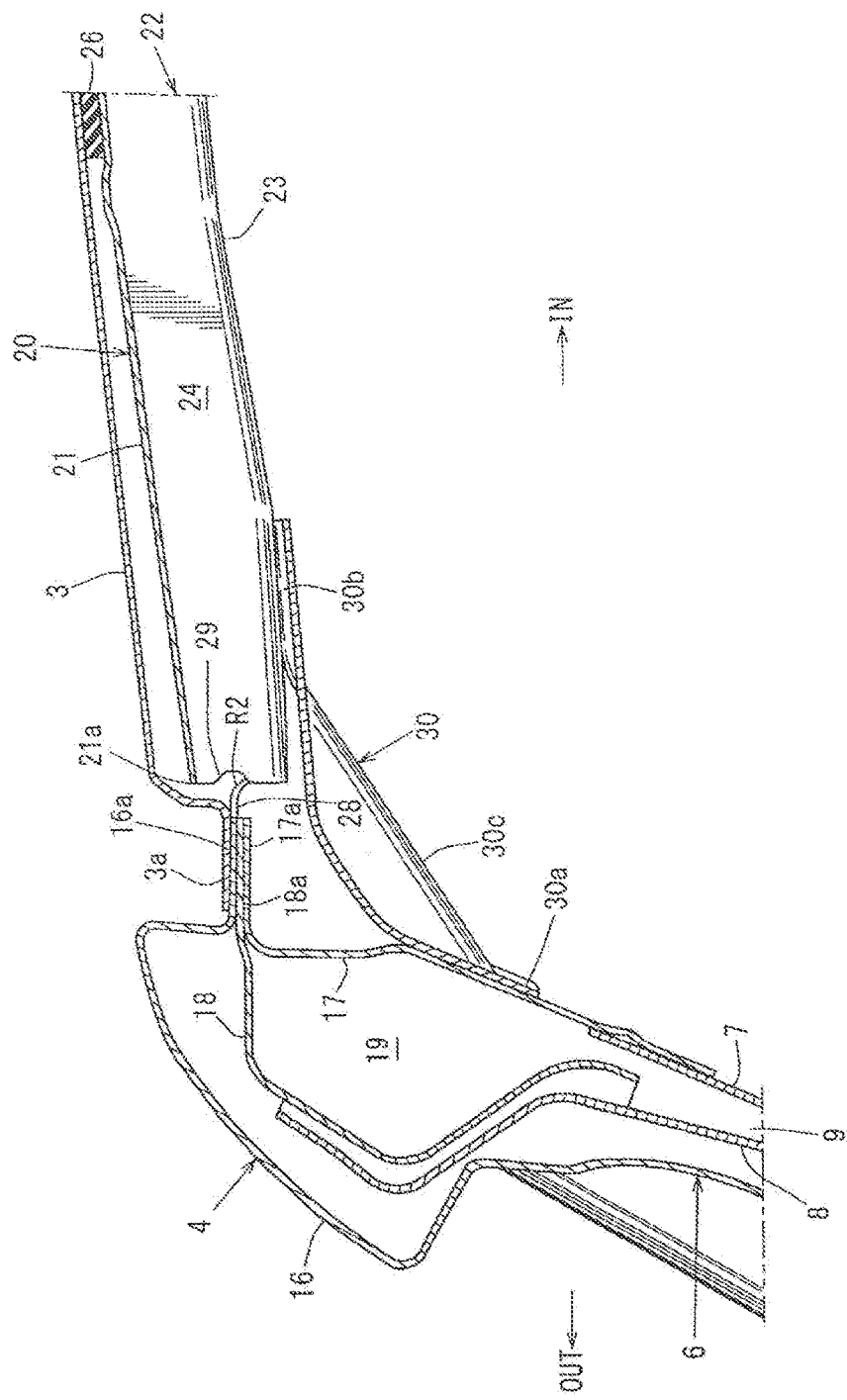
FIG. 3 is a sectional view taken along arrows A-A in FIG. 2.
Figure 4:
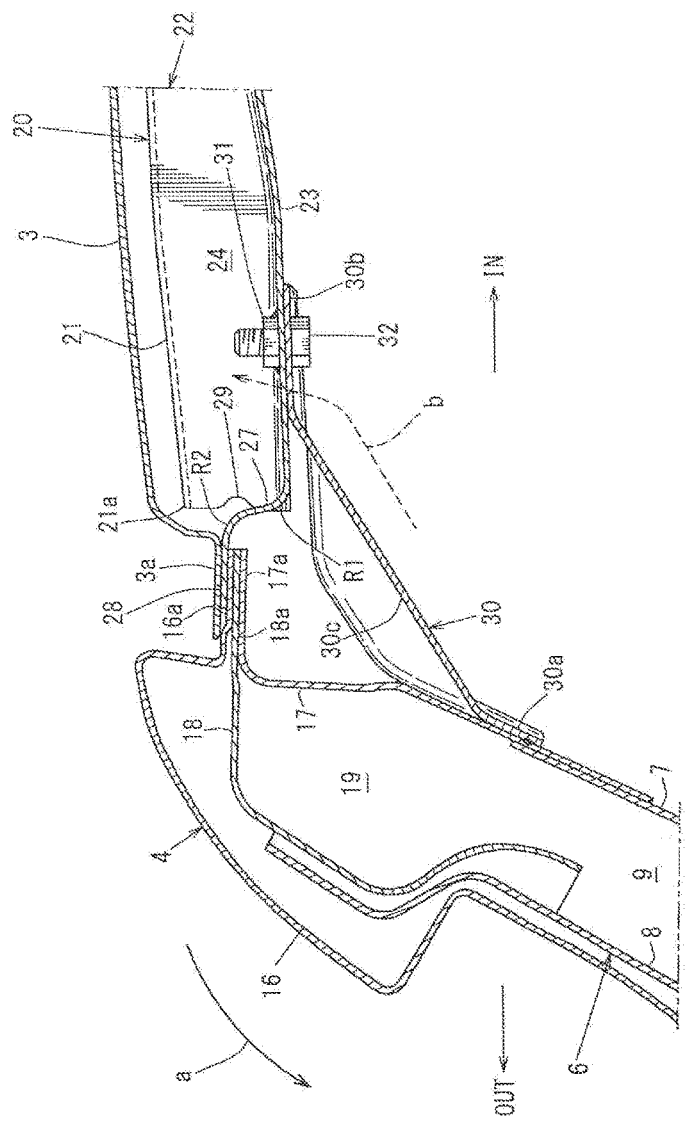
FIG. 4 is a sectional view taken along arrows B-B in FIG. 2.
Figure 5:
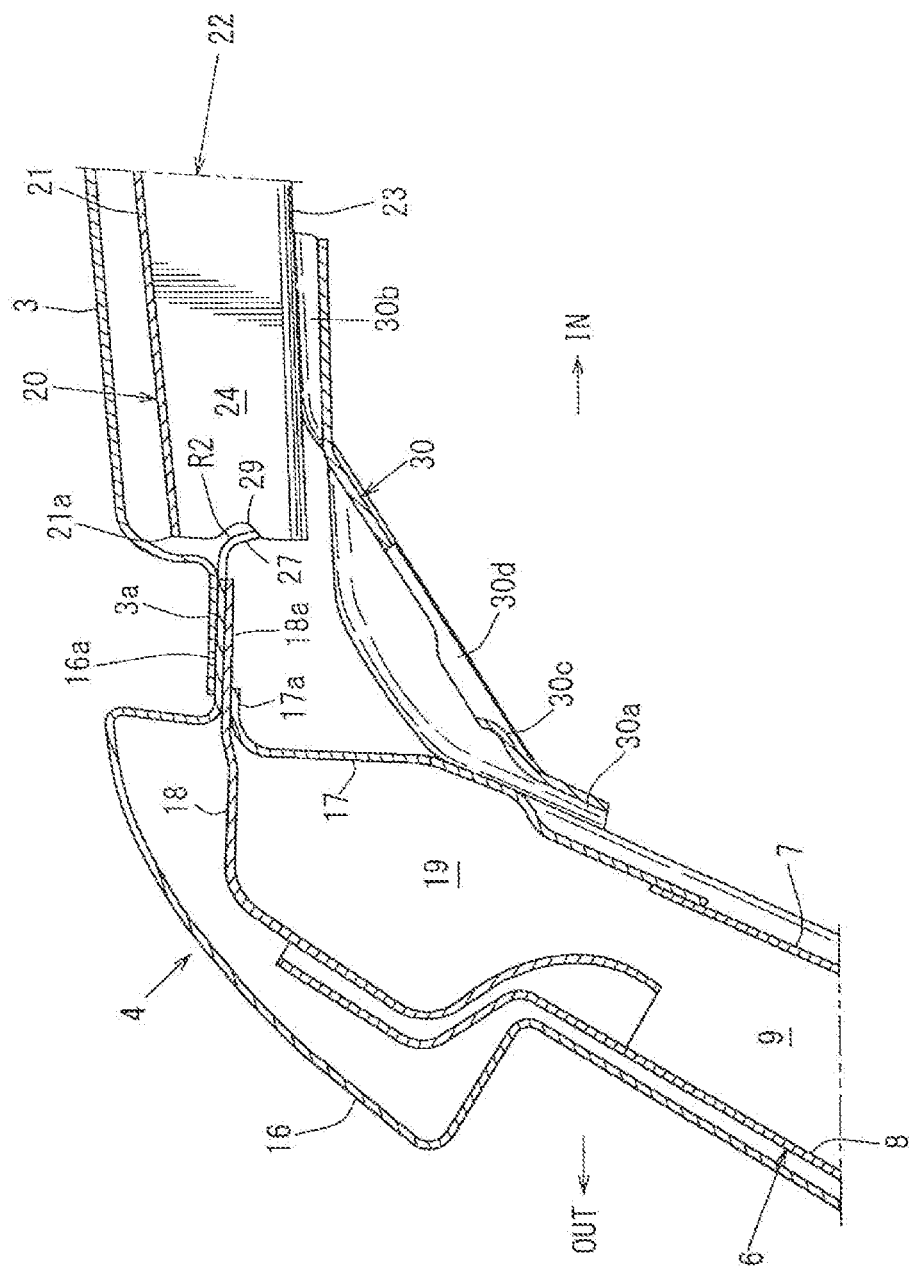
FIG. 5 is a sectional view taken along arrows C-C in FIG. 2.

The drawings illustrate an embodiment of a vehicle body side structure for a vehicle. FIG. 1 is an overall side view of the vehicle body side structure. FIG. 2 is a bottom surface view illustrating essential parts of a vehicle body structure of a vehicle right side part, as viewed from below. FIG. 3 is a cross-sectional view taken along arrows A-A in FIG. 2. FIG. 4 is a sectional view taken along arrows B-B in FIG. 2. FIG. 5 is a sectional view taken along arrows C-C in FIG. 2.

In the drawings, the arrow F indicates the vehicle front side, the arrow R indicates the vehicle rear side, the arrow IN indicates inwardly in the vehicle width direction, and the arrow OUT indicates outwardly in the vehicle width direction. In each of the drawings, only the configuration of the vehicle left side part is illustrated. The configuration of the vehicle right side part is the same as the configuration of the vehicle left side part (it should be noted, however, the configuration of the vehicle left side part and the configuration of the vehicle right side part are laterally symmetrical to each other).

The overall configuration of the vehicle body side structure in the embodiment is schematically described referring to FIG. 1.

The vehicle body includes a pair of side sills 1 and a pair of roof side rail portions 4 at the lower end and the upper end on left and right portions thereof. A pair of hinge pillars 5, a pair of front pillars 2, a pair of center pillars 6, a pair of rear side panels 10, a pair of rear pillars 11, and a pair of quarter pillars 12 are disposed between the side sills 1 and the roof side rail portions 4. The vehicle body is further provided with, on the upper surface portion thereof, a roof panel 3 for covering a region between the paired roof side rail portions 4 and a roof reinforcement 20 disposed on the lower surface of the roof panel 3 (see FIG. 2, FIG. 3, etc.).

The side sill 1 is disposed to extend in the vehicle front-rear direction along the lower lateral edge portion of the vehicle body. The side sill 1 is a vehicle body reinforcement member including a side sill inner member and a side sill outer member joined to each other. A closed cross section extending in the vehicle front-rear direction is formed inside the side sill 1.

The hinge pillar 5 is disposed to extend vertically between the front end of the side sill 1 and the front end of the front pillar 2. The side sill 1 and the front pillar 2 are connected to each other via the hinge pillar 5. The hinge pillar 5 is a vehicle body reinforcement member including a hinge pillar inner member and a hinge pillar outer member joined to each other. A vertically extending closed cross section is formed inside the hinge pillar 5.

The front pillar 2 is disposed to extend continuously from the upper end of the hinge pillar 5 while being inclined upwardly toward the vehicle rear side. The front pillar 2 is a vehicle body reinforcement member including a front pillar inner member and a front pillar outer member joined to each other. An obliquely vertically extending closed cross section is formed inside the front pillar 2.

The roof side rail portion 4 is disposed to extend continuously from the upper end of the front pillar 2 toward the vehicle rear side. The detailed structure of the roof side rail portion 4 is described later.

The center pillar 6 is disposed to extend vertically between the front-rear direction intermediate portion of the side sill 1, and the front-rear direction intermediate portion of the roof side rail portion 4. The side sill 1 and the roof side rail portion 4 are connected to each other via the center pillar 6. As illustrated in FIG. 3, FIG. 4, and FIG. 5, the center pillar 6 is a vehicle body reinforcement member including a center pillar inner member 7 and a center pillar outer member 8 joined to each other. A vertically extending closed cross section 9 is formed inside the center pillar 6.

As illustrated in FIG. 1, the rear pillar 11 is disposed to obliquely vertically connect between the rear side panel 10 and the rear end of the roof side rail portion 4. The rear pillar 11 is a vehicle body reinforcement member including a rear pillar inner panel and a rear pillar outer panel joined to each other. An obliquely vertically extending closed cross section is formed inside the rear pillar 11.

The quarter pillar 12 is disposed to obliquely vertically connect between the rear portion of the roof side rail portion 4, and the front side upper portion of the rear side panel 10 on the front side of the rear pillar 11. The quarter pillar 12 is a vehicle body reinforcement member including a quarter inner panel and a quarter outer panel joined to each other. An obliquely vertically extending closed cross section is formed inside the quarter pillar 12.

A front door opening 13 defined by the hinge pillar 5, the front pillar 2, the roof side rail portion 4, the center pillar 6, and the side sill 1 is formed in the vehicle body side surface. Further, a rear door opening 14 defined by the center pillar 6, the roof side rail portion 4, the quarter pillar 12, and the side sill 1 is formed in the vehicle body side surface. Further, a quarter window opening 15 defined by the quarter pillar 12, the roof side rail portion 4, the rear pillar 11, and the upper edge portion of the rear side panel 10 is formed in the vehicle body side surface.

Next, a detailed structure of the roof side rail portion 4 and the roof reinforcement 20 is described.

Each of the paired left and right roof side rail portions 4 extends in the vehicle front-rear direction while crossing the upper portion of the center pillar 6. As illustrated in FIG. 3, FIG. 4, and FIG. 5, the roof side rail portion 4 is a vehicle body reinforcement member including a roof side rail outer member 16, a roof side rail inner member 17, and a reinforcement member 18 joined to each other. A closed cross section 19 extending in the vehicle front-rear direction is formed inside the roof side rail portion 4. The roof side rail outer member 16 is joined to the upper potion of the center pillar outer member 8. The roof side rail inner member 17 is joined to the upper portion of the center pillar inner member 7.

As illustrated in FIG. 2 to FIG. 5, the roof reinforcement 20 extends in the vehicle width direction along the lower surface of the roof panel 3, and connects between the paired roof side rail portions 4 at the positions corresponding to the center pillars 6.

As illustrated in FIG. 3, FIG. 4, and FIG. 5, the roof panel 3 is integrally formed with a flange portion 3a at a one-step lower position on the outer side thereof in the vehicle width direction. Specifically, the outer end of the roof panel 3 in the vehicle width direction has a step portion with an L-shape in section. The bottom portion of the step portion serves as the flange portion 3a. Further, the roof side rail outer member 16 is integrally formed with a flange portion 16a at a one-step lower position on the inner side thereof in the vehicle width direction. Specifically, the inner end of the roof side rail outer member 16 in the vehicle width direction has a step portion with an L-shape in section. The bottom portion of the step portion serves as the flange portion 16a. Further, the reinforcement member 18 is integrally formed with a flange portion 18a projecting inwardly in the vehicle width direction at the upper end thereof. Furthermore, the roof side rail inner member 17 is integrally formed with a flange portion 17a projecting inwardly in the vehicle width direction at the upper end thereof.

As illustrated in FIG. 3, the flange portion 3a of the roof panel 3, the flange portion 16a of the roof side rail outer member 16, the flange portion 18a of the reinforcement member 18, and the flange portion 17a of the roof side rail inner member 17 are disposed one over the other in this order from the upper side to the lower side. The flange portions 3a, 16a, 18a, and 17a are fixed to each other by spot welding.

Figure 6:
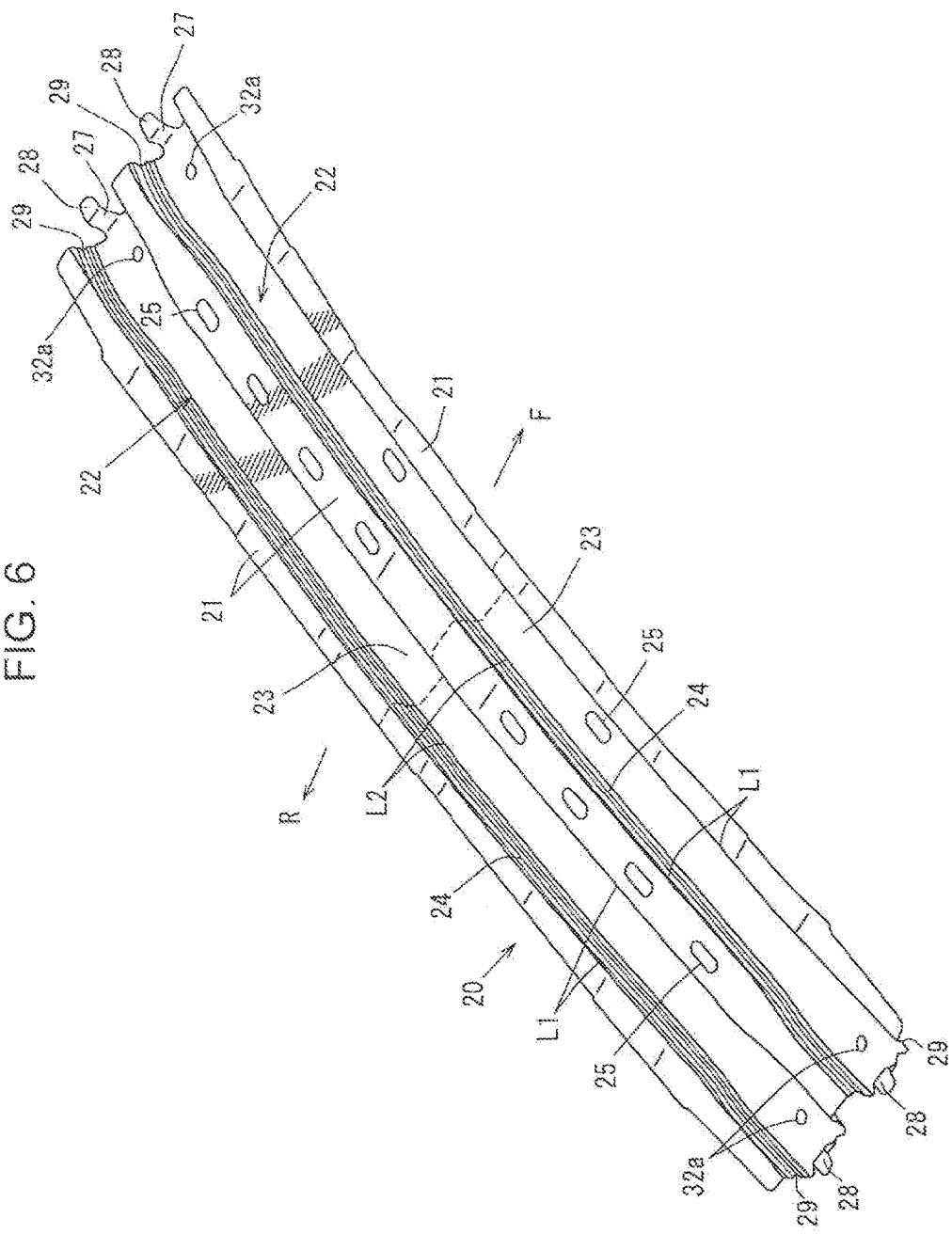
FIG. 6 is a perspective view of a roof reinforcement.
Figure 7:
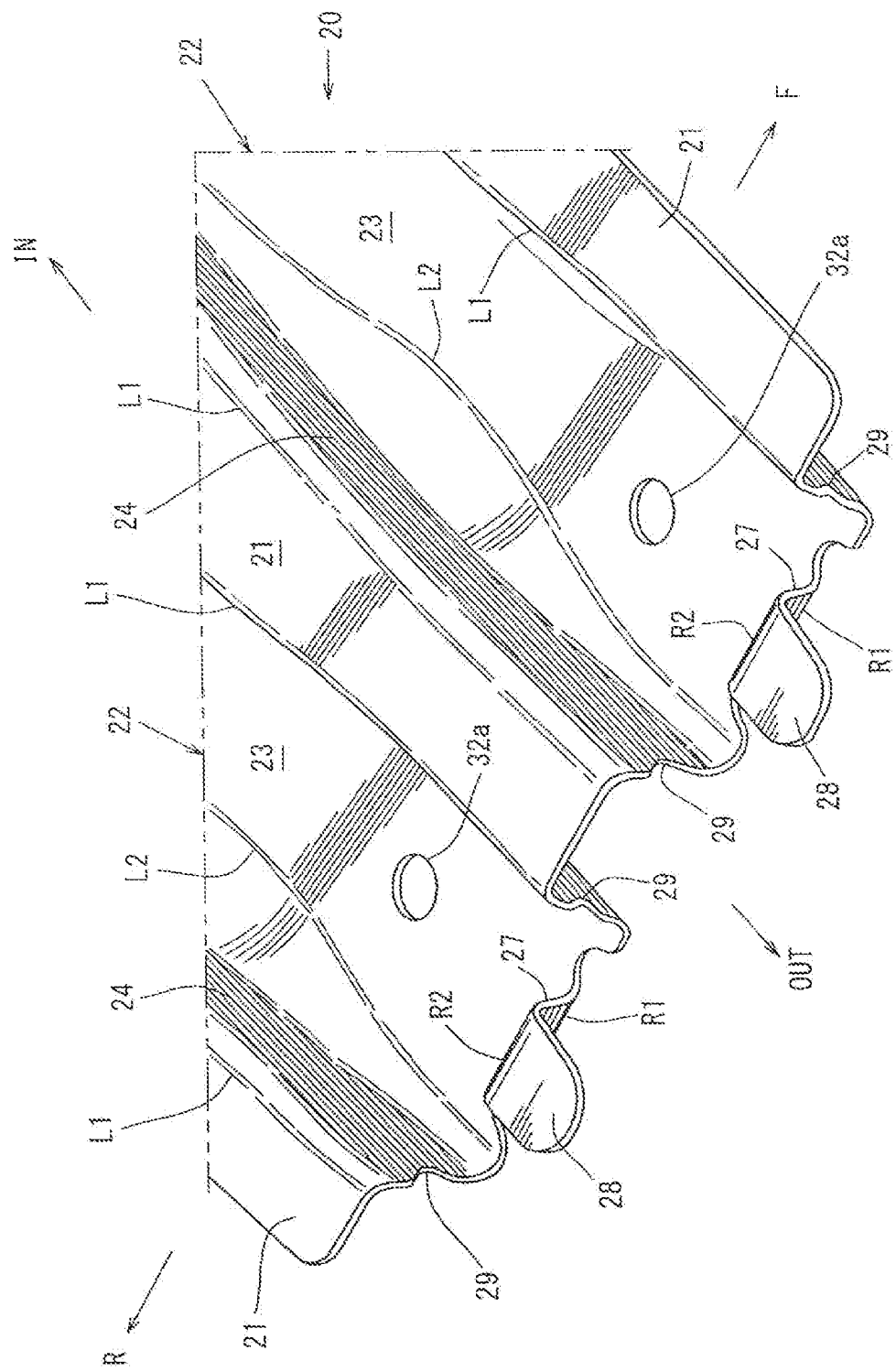
FIG. 7 is an essential part enlarged perspective view of the roof reinforcement.

As illustrated in FIG. 6, FIG. 7, and FIG. 8, the roof reinforcement 20 has a structure (substantially W-shape) such that portions having an upside down hat shape in side view are joined in parallel. Specifically, the roof reinforcement 20 includes three upper surface portions 21 spaced away from each other in the vehicle front-rear direction, and two recess portions 22 formed between the upper surface portions 21 to be recessed downward. Each of the recess portions 22 includes a bottom surface portion 23, and a pair of vertical wall portions 24 for vertically connecting between ends of the bottom surface portion 23 in the vehicle front-rear direction and the upper surface portion 21.

A ridge portion L1 extending in the vehicle width direction is formed between the upper end of the vertical wall portion 24 and the upper surface portion 21. Likewise, a ridge portion L2 extending in the vehicle width direction is formed between the lower end of the vertical wall portion 24 and the bottom surface portion 23.

Each of the three upper surface portions 21 of the roof reinforcement 20 is disposed in contact with or in proximity to the lower surface of the roof panel 3, and is joined to the roof panel 3 via an adhesive 26 illustrated in FIG. 3.

As illustrated in FIG. 6, the (intermediate) upper surface portion 21 between the front-side upper surface portion 21 and the rear-side upper surface portion 21 is formed to have a large width in the vehicle front-rear direction, as compared with the front-side upper surface portion 21 and the rear-side upper surface portion 21. A certain number of opening portions 25 are formed in the intermediate upper surface portion 21 and in the bottom surface portions 23 for weight reduction.

As illustrated in FIG. 4, FIG. 7, and FIG. 8, both ends of the roof reinforcement 20 in the vehicle width direction are integrally formed with a rising piece 27 rising at a substantially right angle (substantially vertically upwardly) from the bottom surface portion 23 of the recess portion 22 via a rounded portion R1, and a joint piece 28 extending at a substantially right angle (substantially horizontally outwardly in the vehicle width direction) from the upper end of the rising piece 27 via a rounded portion R2.

As illustrated in FIG. 4, the joint piece 28 is formed between the flange portion 3a of the roof panel 3, and the flange portion 16a of the roof side rail outer member 16. Specifically, the flange portion 3a of the roof panel 3, the joint piece 28, the flange portion 16a of the roof side rail outer member 16, the flange portion 18a of the reinforcement member 18, and the flange portion 17a of the roof side rail inner member 17 are disposed one over the other in this order from the upper side to the lower side at cross sectional positions where the joint piece 28 is present. Spot welding the flange portion 3a of the roof panel 3 to the joint piece 28, and spot welding each of the flange portions 16a, 17a, and 18a of the roof side rail portion 4 to the joint piece 28 makes it possible to fix all the flange portions 3a, 16a, 17a, and 18a to the joint piece 28.

As described above, in the embodiment, the joint piece 28 is integrally formed with the bottom surface portion 23 of the roof reinforcement 20 via the rising piece 27. The joint piece 28 is welded to each of the flange portions 3a, 16a, 17a, and 18a. If the joint piece 28 is not formed, it is necessary to weld the upper surface portion 21 of the roof reinforcement 20 to each of the flange portions 3a, 16a, 17a, and 18a, as exemplified by the conventional structure illustrated in FIG. 9. In this case, it is necessary to lower the height of the upper surface portion 21 in accordance with the welding position (to be away from the roof panel 3) at both ends of the roof reinforcement 20 in the vehicle width direction. Contrary to the above, when the joint piece 28 is formed on the bottom surface portion 23 as described in the embodiment, the aforementioned countermeasure such that the height of the upper surface portion 21 is lowered is not particularly necessary.

In view of the above, in the embodiment, as illustrated in FIG. 3, FIG. 4, and FIG. 5, the upper surface portion 21 of the roof reinforcement 20 is formed substantially in parallel to the roof panel 3 over the entire length of the roof reinforcement 20 in the vehicle width direction. An outer end 21a of the upper surface portion 21 in the vehicle width direction is set to be higher than the joint position between the joint piece 28 and each of the flange portions 3a, 16a, 17a, and 18a.

In other words, unlike the conventional structure illustrated in FIG. 9, in the embodiment, the cross sectional space of the roof reinforcement 20 is not gradually decreased at the end of the roof reinforcement 20 in the vehicle width direction, in other words, the cross sectional space of the roof reinforcement 20 is formed substantially equally over the entire length of the roof reinforcement 20 in the vehicle width direction. This means that a sufficient cross sectional space is secured even around the end of the roof reinforcement 20. Therefore, as compared with the conventional structure, it is possible to secure sufficient load transfer performance by the roof reinforcement 20 at the time of side collision of a vehicle.

Further, in the embodiment, the inner end of each of the flange portions 16*a*, 17*a*, and 18*a* of the roof side rail portion 4 in the vehicle width direction is formed to face the vertical wall portion 24 of the roof reinforcement 20. According to this configuration, load input to the roof side rail portion 4 at the time of side collision is securely received by the vertical wall portion 24. This makes it possible to securely transfer the side collision load to the opposite side in the vehicle width direction via the roof reinforcement 20.

As illustrated in FIG. 4 and FIG. 7, the vertical wall portion 24 of the roof reinforcement 20 has a cutaway portion 29 at both ends of the roof reinforcement 20 in the vehicle width direction to face the flange portions 16*a*, 17*a*, and 18*a* of the roof side rail portion 4. The cutaway portion 29 is formed at a position capable of receiving the flange portions 16*a*, 17*a*, and 18*a* of the roof side rail portion 4, which may be deformed inwardly in the vehicle width direction at the time of side collision of a vehicle.

Specifically, when a side collision load is input to the center pillar 6 at the time of side collision, as illustrated by the arrow a in FIG. 4, a moment of rotation is applied to the roof side rail portion 4 in such a direction as to pivotally move the upper portion of the roof side rail portion 4 obliquely downwardly and outwardly in the vehicle width direction, as a reaction of the side collision load. Then, the roof side rail portion 4 is attempted to intrude inwardly in the vehicle width direction, while being pivotally moved by the moment of rotation and the side collision load acting inwardly in the vehicle width direction. Before the aforementioned phenomenon occurs, however, the flange portions 16*a*, 17*a*, and 18*a* of the roof side rail portion 4 are received in the cutaway portion 29. Therefore, further pivotal movement of the roof side rail portion 4 is prevented.

As illustrated in FIG. 2 to FIG. 5, a roof gusset 30, as a load transfer member for transferring a side collision load to the roof reinforcement 20, is disposed to extend diagonally between the bottom surface portion 23 of the roof reinforcement 20 and the roof side rail inner member 17.

Specifically, as illustrated in FIG. 3, FIG. 4, and FIG. 5, the roof gusset 30 integrally includes a body side mounting portion 30*a* to be fixed to the roof side rail inner member 17; a roof side mounting portion 30*b* formed on the inner side in the vehicle width direction and above the body side mounting portion 30*a*, and configured to be fixed to the bottom surface portion 23 of the roof reinforcement 20; and a connecting portion 30*c* obliquely extending in such a manner as to connect between the body side mounting portion 30*a* and the roof side mounting portion 30*b*. The connecting portion 30*c* is formed to extend from the roof side rail inner member 17 obliquely upwardly toward the bottom surface portion 23.

As illustrated by the dotted-line arrow b in FIG. 4, at the time of input of a side collision load, the roof gusset 30 plays the role of pushing the roof reinforcement 20 upwardly. This makes it possible to retain the positional relationship such that each of the flange portions 16*a*, 17*a*, and 18*a* of the roof side rail portion 4 faces the cutaway portion 29, and allows for the cutaway portion 29 to follow the positions of the flange portions 16*a*, 17*a*, and 18*a* even after a side collision load is input.

Next, the sequence of assembling a vehicle body upper part including the roof gusset 30 is described. First of all, a body side assembly constituted of the center pillar 6, the roof side rail portion 4, and the roof gusset 30 is assembled. At the time of assembling the body side assembly, the body side mounting portion 30*a* of the roof gusset 30 is fixed to the roof side rail inner member 17 by welding.

Subsequently, a roof side assembly constituted of the roof panel 3 and the roof reinforcement 20 is assembled. At the time of assembling the roof side assembly, the joint piece 28 of the roof reinforcement 20 is spot welded to the flange portion 3*a* of the roof panel 3. Further, nuts 31 are fixed in the recess portions 22 of the roof reinforcement 20 (fixed to the upper surfaces of the bottom surface portions 23) by welding. The bottom surface portions 23 where the nuts 31 are fixed by welding are formed with bolt insertion holes 32*a* for receiving bolts 32 to be described later (see FIG. 6 and FIG. 7).

Subsequently, the roof side assembly is fixed to the body side assembly. At the time of fixation, the joint piece 28 of the roof reinforcement 20 is spot welded to the flange portions 16*a*, 17*a*, and 18*a* of the roof side rail portion 4. In order to enable spot welding, an opening portion 30*d* is formed in the roof gusset 30 at a position vertically facing the joint piece 28 and the flange portions 16*a*, 17*a*, and 18*a* (see FIG. 2 and FIG. 5). The opening portion 30*d* has a sufficient size for inserting a welding gun for use in spot welding. This is advantageous in improving workability at the time of spot welding. Further, the existence of the opening portion 30*d* makes it possible to efficiently transfer the side collision load to the roof reinforcement 20, without increasing the rigidity of the roof gusset 30 itself.

Subsequently, the roof gusset 30 is fixed to the roof reinforcement 20. Specifically, the bolts 32 are inserted through unillustrated holes formed in the roof side mounting portion 30*b* of the roof gusset 30 from below. Then, the inserted bolts 32 are fastened to the nuts 31 on the bottom surface portions 23 of the roof reinforcement 20. Thus, the roof gusset 30 is fixed to the roof reinforcement 20.

As described above, the vehicle body side structure for a vehicle in the embodiment includes the roof panel 3, the vertically extending paired left and right center pillars 6, the paired left and right roof side rail portions 4 extending in the vehicle front-rear direction on the upper side of each of the center pillars 6, and the roof reinforcement 20 extending in the vehicle width direction along the lower surface of the roof panel 3, and configured to connect between the paired roof side rail portions 4 at the positions corresponding to the center pillars 6. The roof side rail portion 4 includes the roof side rail outer member 16 and the roof side rail inner member 17. The roof panel 3 includes the flange portion 3*a* at a one-step lower position on the outer side thereof in the vehicle width direction. The roof side rail outer member 16 includes the flange portion 16*a* at a one-step lower position on the inner side thereof in the vehicle width direction. The roof side rail inner member 17 includes the flange portion 17*a* at the upper end thereof. The flange portion 3*a* of the roof panel 3, the flange portion 16*a* of the roof side rail outer member 16, and the flange portion 17*a* of the roof side rail inner member 17 are welded to each other. The roof reinforcement 20 includes the upper surface portion 21 joined to the roof panel 3, and the recess portion 22 formed to be recessed below the upper surface portion 21. The rising piece 27 rising from the bottom surface portion 23 of the recess portion 22 upwardly, and the joint piece 28 extending from the upper end of the rising piece 27 outwardly in the vehicle width direction are formed at both ends of the bottom surface portion 23 in the vehicle width direction. The joint piece 28 is welded to each of the flange portions 3*a*, 16*a*, and 17*a* (see FIG. 1 to FIG. 8).

According to the aforementioned configuration, it is possible to efficiently distribute a side collision load input to the center pillar 6, and to prevent intrusion of the center pillar 6 into a vehicle chamber at the time of side collision as much as possible.

Specifically, in the embodiment, the joint piece 28 is formed on the bottom surface portion 23 of the roof reinforcement 20 via the rising piece 27. The joint piece 28 is welded to each of the flange portions 3a, 16a, and 17a. Therefore, for instance, unlike a configuration, in which the upper surface portion 21 of the roof reinforcement 20 is welded to each of the flange portions 3a, 16a, and 17a, the shape of the upper surface portion 21 is not specifically limited. This brings the upper surface portion 21 in proximity to the roof panel 3, and to secure a sufficient cross sectional space within the roof reinforcement 20. The sufficiently large cross sectional space as described above makes it possible to prevent deformation of the roof side rail portion 4 by the roof reinforcement 20, even when the roof side rail portion 4 is attempted to be deformed by a side collision load input to the center pillar 6 at the time of side collision of a vehicle. Thus, the aforementioned configuration is advantageous in preventing deformation of the roof side rail portion 4.

Further, it is possible to efficiently transfer a side collision load input to the center pillar 6 to the opposite side in the vehicle width direction via the roof reinforcement 20 having a sufficient cross sectional space. According to this configuration, load distribution performance at the time of side collision is enhanced. This is advantageous in preventing intrusion of the center pillar 6 into a vehicle chamber as much as possible.

In the embodiment, the recess portion 22 of the roof reinforcement 20 has the vertical wall portion 24 for vertically connecting between the upper surface portion 21 and the bottom surface portion 23. The upper surface portion 21 of the roof reinforcement 20 is formed substantially in parallel to the roof panel 3 over the entire length of the roof reinforcement 20 in the vehicle width direction. Further, the end portion 21a of the upper surface portion 21 is formed at a position higher than the joint position between the joint piece 28, and each of the flange portions 3a, 16a, and 17a. Further, the end of each of the flange portions 16a and 17a of the roof side rail portion 4 faces the vertical wall portion 24 (see FIG. 3, FIG. 6, FIG. 7, and FIG. 8).

According to this configuration, it is possible to substantially equally secure the cross sectional space of the roof reinforcement 20 over the entire length of the roof reinforcement 20 in the vehicle width direction, and it is possible to securely avoid reducing the cross sectional space around the end of the roof reinforcement 20 in the vehicle width direction. Thus, the aforementioned configuration is advantageous in enhancing load transfer performance by the roof reinforcement 20.

Further, the end of each of the flange portions 16a and 17a of the roof side rail portion 4 faces the vertical wall portion 24 of the roof reinforcement 20. This makes it possible to securely receive the load input from the roof side rail portion 4 by the vertical wall portion 24. Thus, it is possible to securely transfer the load to the opposite side in the vehicle width direction via the roof reinforcement 20.

In the embodiment, the cutaway portion 29 is formed in the vertical wall portion 24 of the roof reinforcement 20 at a position facing each of the flange portions 16a and 17b of the roof side rail portion 4 (see FIG. 3 and FIG. 7).

According to this configuration, it is possible to securely transfer a side collision load to the opposite side in the vehicle width direction via the roof reinforcement 20, and to enhance load distribution performance at the time of side collision.

Specifically, when a side collision load is input to the center pillar 6 at the time of side collision of a vehicle, a moment of rotation as illustrated by the arrow a in FIG. 4 is applied to the roof side rail portion 4 as a reaction of the side collision load. The roof side rail portion 4 is attempted to intrude inwardly in the vehicle width direction, while the upper portion of the roof side rail portion 4 is pivotally moved obliquely downwardly by the moment of rotation and the side collision load acting inwardly in the vehicle width direction. Before the aforementioned phenomenon occurs, however, the flange portions 16a and 17a of the roof side rail portion 4 are received in the cutaway portion 29 of the roof reinforcement 20. This makes it possible to prevent further pivotal movement of the roof side rail portion 4.

Further, the flange portions 16a and 17a face the vertical wall portion 24. Therefore, it is possible to securely receive the load input from the roof side rail portion 4 by the vertical wall portion 24. Further, it is possible to securely transfer the received load to the roof side rail portion and the center pillar on the opposite side in the vehicle width direction via the roof reinforcement 20 having a sufficient cross sectional space. This is advantageous in enhancing load distribution performance at the time of side collision.

As described above, in the embodiment, it is possible to prevent intrusion of the center pillar 6 into a vehicle chamber at the time of side collision as much as possible. The structure of the embodiment providing the aforementioned effects is particularly useful in SUVs (Sports Utility Vehicles) having a high vehicle height.

In the embodiment, the roof gusset 30 (load transfer member) is disposed between the bottom surface portion 23 of the roof reinforcement 20 and the roof side rail inner member 17 for connecting between the roof reinforcement 20 and the roof side rail inner member 17. The roof gusset 30 includes the connecting portion 30c extending from the roof side rail inner member 17 obliquely upwardly toward the bottom surface portion 23 (see FIG. 3, FIG. 4, and FIG. 5).

According to the aforementioned configuration, it is possible to enhance load distribution performance at the time of side collision.

Specifically, when a moment of rotation (see the arrow a in FIG. 4) is applied to the roof side rail portion 4 at the time of side collision of a vehicle, as illustrated by the arrow b in FIG. 4, the roof reinforcement 20 is pushed upwardly by the roof gusset 30, and the positional relationship such that the flange portions 16a and 17a of the roof side rail portion 4 face the cutaway portion 29 is retained. In this way, even after a side collision load is input, the cutaway portion 29 follows the positions of the flange portions 16a and 17a. Therefore, it is possible to securely transfer the side collision load to the opposite side in the vehicle width direction via the roof reinforcement 20.

A preferred embodiment of the invention has been described as above. However, various modifications are applicable to the invention, as far as such modifications do not depart from the scope of the claims. The invention is not limited by the configuration of the embodiment.

The following is a summary of the features and the advantageous effects of the embodiment as described above.

A vehicle body side structure for a vehicle in the embodiment is provided with a roof panel; a pair of vertically extending left and right center pillars; a pair of left and right roof side rail portions extending in a front-rear direction of the vehicle on an upper side of each of the center pillars; and a roof reinforcement extending in a vehicle width direction along a lower surface of the roof panel, and configured to connect between the paired roof side rail portions at positions corresponding to the center pillars. The roof side rail portion includes a roof side rail outer member and a roof side rail inner member. The roof panel includes a flange portion at a one-step lower position on an outer side thereof in the vehicle width direction. The roof side rail outer member includes a flange portion at a one-step lower position on an inner side thereof in the vehicle width direction. The roof side rail inner member includes a flange portion at an upper end thereof. The flange portion of the roof side rail outer member, the flange portion of the roof side rail inner member, and the flange portion of the roof panel are welded to each other. The roof reinforcement includes an upper surface portion joined to the roof panel, and a recess portion formed to be recessed below the upper surface portion. A rising piece rising from a bottom surface portion of the recess portion upwardly, and a joint piece extending from an upper end of the rising piece outwardly in the vehicle width direction are formed at both ends of the bottom surface portion in the vehicle width direction. The joint piece is welded to each of the flange portions.

According to the aforementioned configuration, the joint piece is formed on the bottom surface portion of the roof reinforcement via the rising piece. Therefore, the shape of the upper surface portion of the roof reinforcement is not specifically limited. This brings the upper surface portion in proximity to the roof panel, and to secure a sufficient cross sectional space within the roof reinforcement. Thus, the aforementioned configuration is advantageous in preventing deformation of the roof side rail portion at the time of side collision of a vehicle.

Further, it is possible to efficiently transfer the side collision load input to the center pillar to the opposite side in the vehicle width direction via the roof reinforcement having a sufficient cross sectional space. This makes it possible to enhance load distribution performance at the time of side collision. This is advantageous in preventing intrusion of the center pillar into a vehicle chamber as much as possible.

In the vehicle body side structure, preferably, the recess portion of the roof reinforcement may include a vertical wall portion for vertically connecting between the upper surface portion and the bottom surface portion, the upper surface portion of the roof reinforcement may be formed substantially in parallel to the roof panel over an entire length of the roof reinforcement in the vehicle width direction, an end of the upper surface portion may be formed at a position higher than a joint position between the joint piece and each of the flange portions, and an end of the flange portion of the roof side rail portion may face the vertical wall portion.

According to the aforementioned configuration, it is possible to substantially equally secure the cross sectional space of the roof reinforcement over the entire length of the roof reinforcement in the vehicle width direction, and it is possible to securely avoid reducing the cross sectional space around the end of the roof reinforcement in the vehicle width direction. Thus, the aforementioned configuration is advantageous in enhancing load transfer performance by the roof reinforcement.

Further, the end of the flange portion of the roof side rail portion faces the vertical wall portion of the roof reinforcement. This makes it possible to securely receive the load input from the roof side rail portion by the vertical wall portion. Thus, it is possible to securely transfer the load to the opposite side in the vehicle width direction via the roof reinforcement.

In the aforementioned configuration, more preferably, the vertical wall portion of the roof reinforcement may be formed with a cutaway portion at a position facing the flange portion of the roof side rail portion.

The aforementioned configuration provides the following advantageous effects.

Specifically, when a side collision load is input to the center pillar at the time of side collision of a vehicle, the roof side rail portion is attempted to intrude inwardly in the vehicle width direction, while the upper portion of the roof side rail portion is pivotally moved obliquely downwardly by the side collision load and a moment of rotation generated as a reaction of the side collision load. Before the aforementioned phenomenon occurs, however, the flange portion of the roof side rail portion is received in the cutaway portion of the roof reinforcement. This makes it possible to prevent further pivotal movement of the roof side rail portion. Thus, it is possible to securely transfer the side collision load to the opposite side in the vehicle width direction via the roof reinforcement. This is advantageous in enhancing load distribution performance at the time of side collision.

In the aforementioned configuration, more preferably, the vehicle body side structure may further include a load transfer member disposed between the bottom surface portion of the roof reinforcement and the roof side rail inner member, and configured to connect between the roof reinforcement and the roof side rail inner member. The load transfer member may include a portion extending from the roof side rail inner member obliquely upwardly toward the bottom surface portion.

According to the aforementioned configuration, when the roof side rail portion is attempted to be pivotally moved by a moment of rotation generated at the time of side collision of a vehicle, the roof reinforcement is pushed upwardly by the load transfer member, and the positional relationship such that the flange portion of the roof side rail portion faces the cutaway portion is retained. In this way, even after a side collision load is input, the cutaway portion follows the position of the flange portion. Therefore, it is possible to securely transfer the side collision load to the opposite side in the vehicle width direction via the roof reinforcement.

The invention claimed is:

1. A vehicle body side structure for a vehicle, comprising:
  a roof panel;
  a pair of vertically extending left and right center pillars;
  a pair of left and right roof side rail portions extending in a front-rear direction of the vehicle on an upper side of each of the center pillars; and
  a roof reinforcement extending in a vehicle width direction along a lower surface of the roof panel, and configured to connect between the paired roof side rail portions at positions corresponding to the center pillars, wherein
  the roof side rail portion includes a roof side rail outer member and a roof side rail inner member,
  the roof panel includes a flange portion at a one-step lower position on an outer side thereof in the vehicle width direction,
  the roof side rail outer member includes a flange portion at a one-step lower position on an inner side thereof in the vehicle width direction,
  the roof side rail inner member includes a flange portion at an upper end thereof, the flange portion of the roof side rail outer member, the flange portion of the roof side rail inner member, and the flange portion of the roof panel are welded to each other, the roof reinforcement includes an upper surface portion joined to the roof panel, and a recess portion formed to be recessed below the upper surface portion, a rising piece rising from a bottom surface portion of the recess portion upwardly, and a joint piece extending from an upper end of the rising piece outwardly in the vehicle width direction are formed at both ends of the bottom surface portion in the vehicle width direction, and the joint piece is welded to each of the flange portions, wherein the recess portion of the roof reinforcement includes a vertical wall portion for vertically connecting between the upper surface portion and the bottom surface portion, the upper surface portion of the roof reinforcement is formed substantially in parallel to the roof panel over an entire length of the roof reinforcement in the vehicle width direction, an end of the upper surface portion is formed at a position higher than a joint position between the joint piece and each of the flange portions, and an end of the flange portion of the roof side rail portion faces the vertical wall portion.

2. The vehicle body side structure for a vehicle according to claim 1, wherein the vertical wall portion of the roof reinforcement is formed with a cutaway portion at a position facing the flange portion of the roof side rail portion.

3. The vehicle body side structure for a vehicle according to claim 2, further comprising a load transfer member disposed between the bottom surface portion of the roof reinforcement and the roof side rail inner member, and configured to connect between the bottom surface portion and the roof side rail inner member, wherein the load transfer member includes a portion extending from the roof side rail inner member obliquely upwardly toward the bottom surface portion.

4. A vehicle body side structure for a vehicle, comprising:
a roof panel;
a pair of vertically extending left and right center pillars;
a pair of left and right roof side rail portions extending in a front-rear direction of the vehicle on an upper side of each of the center pillars; and
a roof reinforcement extending in a vehicle width direction along a lower surface of the roof panel, and configured to connect between the paired roof side rail portions at positions corresponding to the center pillars, wherein the roof side rail portion includes a roof side rail outer member and a roof side rail inner member, the roof panel includes a flange portion at a one-step lower position on an outer side thereof in the vehicle width direction, the roof side rail outer member includes a flange portion at a one-step lower position on an inner side thereof in the vehicle width direction, the roof side rail inner member includes a flange portion at an upper end thereof, the flange portion of the roof side rail outer member, the flange portion of the roof side rail inner member, and the flange portion of the roof panel are welded to each other, the roof reinforcement includes an upper surface portion joined to the roof panel, and a recess portion formed to be recessed below the upper surface portion, a rising piece rising from a bottom surface portion of the recess portion upwardly, and a joint piece extending from an upper end of the rising piece outwardly in the vehicle width direction are formed at both ends of the bottom surface portion in the vehicle width direction, the joint piece is welded to each of the flange portions, and the recess portion of the roof reinforcement includes a vertical wall portion for vertically connecting between the upper surface portion and the bottom surface portion, wherein the vertical wall portion of the roof reinforcement is formed with a cutaway portion at a position facing the flange portion of the roof side rail portion.

5. A vehicle body side structure for a vehicle, comprising:
a roof panel;
a pair of vertically extending left and right center pillars;
a pair of left and right roof side rail portions extending in a front-rear direction of the vehicle on an upper side of each of the center pillars; and
a roof reinforcement extending in a vehicle width direction along a lower surface of the roof panel, and configured to connect between the paired roof side rail portions at positions corresponding to the center pillars, wherein the roof side rail portion includes a roof side rail outer member and a roof side rail inner member, the roof panel includes a flange portion at a one-step lower position on an outer side thereof in the vehicle width direction, the roof side rail outer member includes a flange portion at a one-step lower position on an inner side thereof in the vehicle width direction, the roof side rail inner member includes a flange portion at an upper end thereof, the flange portion of the roof side rail outer member, the flange portion of the roof side rail inner member, and the flange portion of the roof panel are welded to each other, the roof reinforcement includes an upper surface portion joined to the roof panel, and a recess portion formed to be recessed below the upper surface portion, a rising piece rising from a bottom surface portion of the recess portion upwardly, and a joint piece extending from an upper end of the rising piece outwardly in the vehicle width direction are formed at both ends of the bottom surface portion in the vehicle width direction, the joint piece is welded to each of the flange portions, and a load transfer member disposed between a bottom surface portion of the roof reinforcement and the roof side rail inner member, and configured to connect between the bottom surface portion and the roof side rail inner member, wherein the load transfer member includes a portion extending from the roof side rail inner member obliquely upwardly toward the bottom surface portion.

* * * * *